US009414123B2

United States Patent
Yie et al.

(10) Patent No.: US 9,414,123 B2
(45) Date of Patent: Aug. 9, 2016

(54) METHOD FOR HYBRID DELIVERY OF MMT PACKAGE AND CONTENT AND METHOD FOR RECEIVING CONTENT

(71) Applicant: HUMAX CO., LTD., Seongnam (KR)

(72) Inventors: Chung Ku Yie, Incheon (KR); Yong Jae Lee, Seoul (KR)

(73) Assignee: HUMAX CO., LTD., Yongin (KR)

( * ) Notice: Subject to any disclaimer, the term of this patent is extended or adjusted under 35 U.S.C. 154(b) by 85 days.

(21) Appl. No.: 14/360,597

(22) PCT Filed: Nov. 26, 2012

(86) PCT No.: PCT/KR2012/010060
§ 371 (c)(1),
(2) Date: May 23, 2014

(87) PCT Pub. No.: WO2013/077697
PCT Pub. Date: May 30, 2013

(65) Prior Publication Data
US 2014/0334504 A1   Nov. 13, 2014

(30) Foreign Application Priority Data

Nov. 25, 2011   (KR) ......... 10-2011-0124607
Nov. 26, 2012   (KR) ......... 10-2012-0134616

(51) Int. Cl.
*H04J 3/24*        (2006.01)
*H04N 21/61*    (2011.01)
*H04H 20/18*   (2008.01)
(Continued)

(52) U.S. Cl.
CPC ........... *H04N 21/6125* (2013.01); *H04H 20/18* (2013.01); *H04H 20/42* (2013.01); *H04N 21/2381* (2013.01); *H04N 21/4381* (2013.01); *H04N 21/615* (2013.01); *H04N 21/631* (2013.01)

(58) Field of Classification Search
None
See application file for complete search history.

(56) References Cited

U.S. PATENT DOCUMENTS

2007/0140650 A1* 6/2007 Suzuki ............ H04N 7/24
  386/291
2011/0119396 A1* 5/2011 Kwon ........... H04N 21/23439
  709/231

(Continued)

FOREIGN PATENT DOCUMENTS

JP   2002-368811 A   12/2002
JP   2010-177858 A   8/2010
(Continued)

OTHER PUBLICATIONS

International Search Report for PCT/KR2012/010060 filed on Nov. 26, 2012.
(Continued)

*Primary Examiner* — Kouroush Mohebbi

(57) ABSTRACT

Disclosed is a hybrid delivery method for content in which content is divided corresponding to the number of means of delivery and transmitted. An hybrid delivery method of content comprises the steps of: detecting the number of delivery means by which a server can transmit content to a client; dividing the content so as to correspond to the detected number of delivery means; generating composition information for each of the divided content; and transmitting the divided content and the composition information to the client using the transmission means. Thus, a variety of transmission means can be used effectively.

20 Claims, 10 Drawing Sheets

(51) Int. Cl.
*H04H 20/42* (2008.01)
*H04N 21/63* (2011.01)
*H04N 21/438* (2011.01)
*H04N 21/2381* (2011.01)

(56) References Cited

U.S. PATENT DOCUMENTS

2012/0324521 A1* 12/2012 Rhyu .................... H04N 21/84
　　　　　　　　　　　　　　　　　　　　　　725/109
2013/0089107 A1* 4/2013 Li ............................ H04L 65/80
　　　　　　　　　　　　　　　　　　　　　　370/412

FOREIGN PATENT DOCUMENTS

| KR | 10-2011-0053178 A | 5/2011 |
| KR | 10-2011-0100932 A | 9/2011 |
| KR | 10-2011-0105710 A | 9/2011 |

OTHER PUBLICATIONS

"Technologies under Consideration (TuC) for MMT", Systems/MMT, Jul. 2011, pp. 1-71, Torino, Italy.

Extended European search report for EP Application No. 12851982.4 dated Mar. 31, 2015.

* cited by examiner

METHOD FOR HYBRID DELIVERY OF MMT PACKAGE AND CONTENT AND METHOD FOR RECEIVING CONTENT

BACKGROUND OF THE INVENTION

1. Field of the Invention

The present invention relates to a method of delivering MMT-packetized content and a method of receiving content and, more particularly, to a method of delivering MMT-packetized content through a plurality of types of delivery means.

2. Discussion of the Related Art

New standards, such as MPEG-4, H.264/AVC, and Scalable Video Coding (SVC), for a video compression standard (or an audio compression standard) since MPEG-2 standardization have been continuously developed for the past ten years. Furthermore, each of the new standards has widened the utilization area of the MPEG standard while forming a new market, but delivery technology, such as a MPEG-2 Transport System (TS), has been widely used in digital broadcasting and mobile broadcasting (T-DMB and DVB-H) in the market during almost 20 years. Furthermore, the MPEG-2 TS is also being widely used in multimedia transmission over the Internet, that is, IPTV service, which was not taken into consideration when a standard for the MPEG-2 TS was established.

However, a multimedia transmission environment when the MPEG-2 TS was developed and a current multimedia transmission environment are experiencing a significant change. For example, the MPEG-2 TS standard was developed to transmit multimedia data over an ATM network when it was established, but today is rarely used for such an object. Furthermore, the MPEG-2 TS standard involves elements which are inefficient for recent multimedia transmission over the Internet because requirements, such as multimedia transmission using the Internet, were not taken inconsideration when the MPEG-2 TS standard was established. Accordingly, in MPEG, the establishment of a MPEG Multimedia Transport Layer (MMT), that is, a new multimedia transmission standard in which multimedia service in the Internet suitable for a changing multimedia environment is taken into consideration, has been recognized as a very important task.

As described above, the reason why MMT standardization is important lies in an urgent need for an international standard for multimedia transmission which has been optimized for recent multimedia transmission environments in various heterogeneous networks because the MPEG2-TS standard established 20 years again has not been optimized for recent IPTV broadcasting service and Internet environments. For this reason, in MPEG, MMT standardization is in progress as a new delivery technology standard.

As described above, in delivering multimedia over various recent heterogeneous networks, a plurality of pieces of delivery means is utilized at the same time. Various types of applications are being attempted to hybrid delivery using the plurality of pieces of delivery means.

PRIOR ART DOCUMENT

Patent Document (Patent Document 1) Korean Patent Application Publication No. 10-2005-0101394 (entitled "Contents Providing System and Method Thereof For Bundle Product" laid open on May 2, 2007 by SK Telecom).

SUMMARY OF THE INVENTION

An object of the present invention is to provide a hybrid delivery method for MMT-packetized content, wherein content is fragmented so that the content corresponds to the number of pieces of delivery means and is delivered, thus having optimum delivery efficiency in various environments.

Furthermore, another object of the present invention is to provide a method of receiving content, wherein pieces of content fragmented and delivered so that the content corresponds to the number of pieces of delivery means are received and aggregated, thus having optimum delivery efficiency in various environments.

A hybrid delivery method for achieving an object of the present invention may include steps of fragmenting content, generating composition information for the pieces of fragmented content, and delivering the pieces of fragmented content to a client using delivery means. In this case, the content may include at least one of a sub-stream, an MPEG Media Transport (MMT) asset, a MMT package, an MPU, an MFU, and a MMT packet. Furthermore, the composition information may be included in at least one of package information of a MMT package, a header of a MMT packet, and a payload. All the pieces of fragmented content may form a single MMT package. Furthermore, each of the pieces of fragmented content may form a single MMT package. The step of delivering the pieces of fragmented content may include delivering the pieces of fragmented content and the composition information to the client if the composition information is present outside the pieces of fragmented content.

A method of receiving content for achieving another object of the present invention may include steps of receiving pieces of fragmented content from a server and aggregating the pieces of fragmented content based on composition information included in the pieces of fragmented content. In this case, the pieces of fragmented content and the composition information may be received from the server if the composition information is present outside the pieces of fragmented content.

DETAILED DESCRIPTION OF THE EMBODIMENTS

Figure 1:
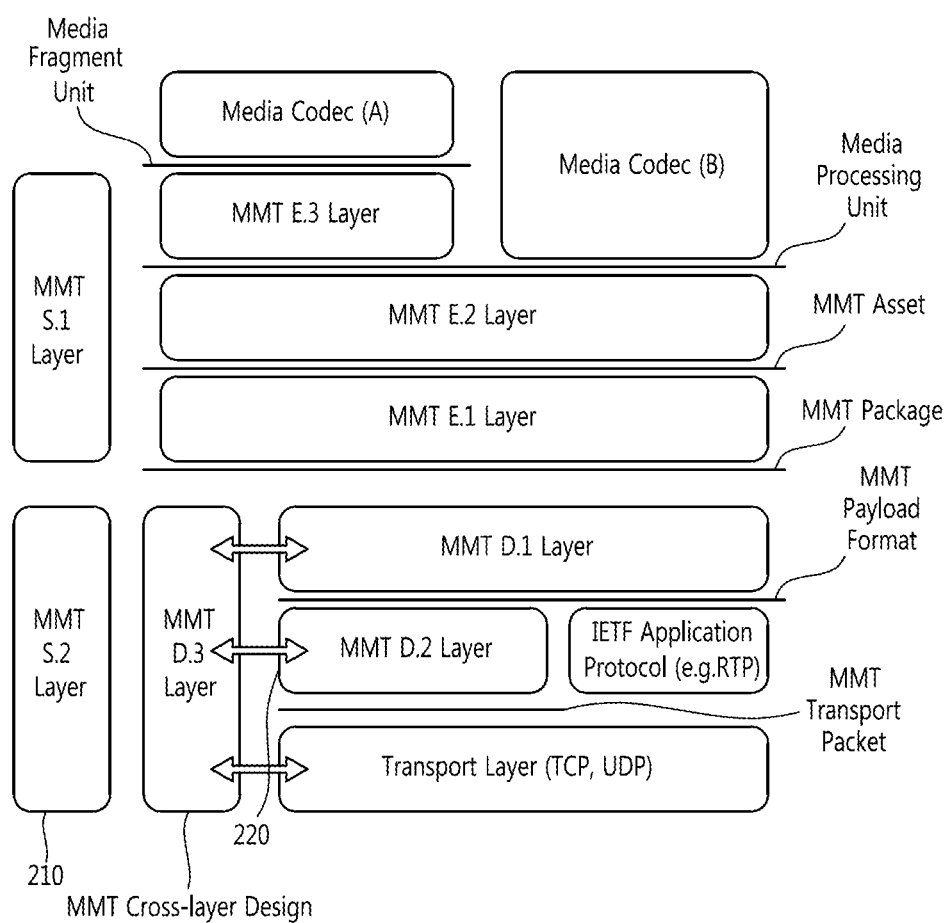
FIG. 1 is a conceptual diagram showing an MMT hierarchical structure in accordance with an embodiment of the present invention.

The present invention may be modified in various ways and may have multiple embodiments, and specific embodiments are illustrated in the drawings and are described in detail.

However, it should be understood that the present invention is not intended to be limited to the specific embodiments and the present invention includes all changes, equivalents, and substitutions that are included in the spirit and technical scope of the present invention.

Terms, such as the first and the second, may be used to describe a variety of elements, but the elements should not be limited by the terms. The terms are used to only distinguish one element from the other element. For example, a first element may be named a second element, and likewise a second element may be named a first element without departing from the scope of the present invention. A term 'and/or' includes a combination of a plurality of related and described items or any one of a plurality of related and described items.

When it is said that one element is described as being 'connected' or 'coupled' to the other element, the one element may be directly connected or coupled to the other element, but it should be understood that a third element may be interposed between the two elements. In contrast, when it is said that one element is described as being 'directly connected' or 'directly coupled' to the other element, it should be understood that a third element is not present between the two elements.

Terms used in this application are used to describe only specific embodiments and are not intended to limit the present invention. An expression of the singular number should be understood to include plural expressions, unless clearly expressed otherwise in the context. It should be understood that terms, such as 'include' or 'have', are intended to indicate the existence of a described characteristic, number, step, operation, element, part, or a combination of them, but are not intended to exclude the existence of one or more other characteristics, numbers, steps, operations, elements, parts, or a combination of them or a possibility addition of them.

All terms used herein, including technical or scientific terms, have the same meanings as those typically understood by those skilled in the art unless otherwise defined. Terms, such as ones defined in common dictionaries, should be construed as having the same meanings as those in the context of related technology and should not be construed as having ideal or excessively formal meanings unless clearly defined in this application.

Hereinafter, preferred embodiments of the present invention are described in more detail with reference to the accompanying drawings. In describing the present invention, in order to facilitate general understanding, the same reference numerals are used to denote the same elements throughout the drawings, and a redundant description of the same elements is omitted.

The meaning of terms is defined below as follows.

Non-timed data defines all data elements that are consumed without specifying time. The non-timed data may have a time range in which data is executed or started.

Timed data defines a data element associated with a specific time at which the timed data is decoded and presented.

Presentation defines an operation performed by one or more devices so that a user can experience (e.g., movie appreciation) a single content component or a single service.

Service defines one or more content components that are delivered for presentation or storage.

Service information defines metadata that describes a single service and the characteristics and components of the service.

An Access Unit (AU) is the smallest data entity and may have time information as its attributes. In relation to coded media data whose time information for decoding and presentation has not been designated, an AU is not defined.

A Media Fragment Unit (MFU) is a common container independent from any specific codec and accommodates coded media data that may be independently consumed by a media decoder. The MFU has a size smaller than or equal to an AU and accommodates information that may be used in the transport layer.

A Media Processing Unit (MPU) is a common container independent from any specific media codec and accommodates information that is related to at least one AU and additional delivery and consumption. For non-timed data, the MPU accommodates the part of data that does not belong to the range of an AU. The MPU is coded media data that may be processed completely and independently. In this context, processing means encapsulation or packetization into an MMT package for delivery.

An MMT asset is a logical data entity which is formed of at least one MPU along with the same MMT asset ID or formed of a specific data lump along with a format defined in another standard. The MMT asset is the largest data unit to which the same composition information and transport characteristics are applied.

MMT Asset Delivery Characteristics (MMT-ADC) are a description related to QoS requirements for delivering an MMT asset. The MMT-ADC is presented so that a specific delivery environment thereof is unaware.

MMT Composition Information (MMT CI) describes a spatial and temporal relationship between MMT assets.

A MMT package is a collection of logically structured data, and it includes at least one MMT asset, MMT-Composition Information (CI), MMT-ADC, and descriptive information.

A MMT packet is the format of data generated or consumed in accordance with an MMT protocol.

A MMT payload format is a format for the payload of a MMT packet or an MMT signaling message to be delivered in accordance with an MMT protocol or an Internet application layer protocol (e.g., RTP).

A content component or a media component is defined as media of a single type or a subset of media of a single type. For example, a video track, movie subtitles, or the enhancement layer of video may become a content component or a media component.

Content is defined as a set of content components. For example, a movie or a song may become content.

Hybrid delivery defines that one or more content components are delivered at the same time over physically different types of one or more networks.

Hereinafter, a first network or a second network includes various types of networks, including a broadcast network, a broadband network, a cable network, or a satellite communication network.

Hereinafter, hybrid delivery may be performed in the form of an MMT asset unit, a sub-stream unit, an MFU, an MPU, an MMT package unit, or an MMT packet unit. Furthermore, if video content is formed of a plurality of layers, such as a first layer and a second layer, hybrid delivery may be performed in the form of a layer unit.

Hereinafter, preferred embodiments of the present invention are described in more detail with reference to the accompanying drawings. In describing the present invention, in order to facilitate general understanding, the same reference numerals are used to denote the same elements throughout the drawings, and a redundant description of the same elements is omitted.

FIG. 1 is a conceptual diagram showing an MPEG Media Transport (MMT) hierarchical structure in accordance with an embodiment of the present invention.

Referring to FIG. 1, the MMT hierarchical structure includes the functional areas of an Encapsulation layer (E-layer), a Delivery layer (D-layer), and a Signaling layer (S layer). A MMT layer operates on a transport layer.

The E-layer defines the logical structure of a format of media content, a MMT package, and data units to be processed by an entity that complies with the MMT. In order to provide information essential for adaptive delivery, a MMT package defines components, including media content, and a relationship between the components. The format of data units is defined to encapsulate media that has been coded so that the media is stored or delivered as the payload of a transport protocol and the media is easily converted between the data units.

The E-layer may be responsible for functions, such as the packetization, fragmentation, synchronization, and multiplexing of delivered media, for example.

Various types of multimedia components may be encapsulated and aggregated in order to be delivered and consumed by the functions provided by the E-layer. Information about encapsulated media components and the configurations of the media components is provided in the functional area of the E-layer.

Major information about encapsulated media components may include information about aggregation, prioritization, the dependency of a media fragment, and the timing and structure of an MPU, information about the ID of an MMT asset 150, initialization information, and codec information. The configuration information of media components may include information about the IDs of a MMT package 160 and the MMT asset 150, configuration information including a list of the MMT assets 150, the composition information 162 of MMT assets 150 within the MMT package 160, and transport characteristics information 164.

The E-layer, as shown in FIG. 1, may include an MMT E.1 layer, an MMT E.2 layer, and an MMT E.3 layer.

The MMT E.3 layer encapsulates a Media Fragment Unit (MFU) provided by a media codec (A) layer and generates a Media Processing Unit (MPU).

Coded media data from a higher layer is encapsulated into an MFU. The type and value of coded media are abstracted so that an MFU can be commonly used in specific codec technology. In such a case, a lower layer can process an MFU without accessing encapsulated coded media, and the lower layer fetches required coded media data from a network or the buffer of a repository and sends the coded media data to a media decoder. The MFU has an information media part unit enough to perform the above operation.

An MFU is independent from a specific codec and may have a format on which a data unit that may be independently consumed by a media decoder can be carried. For example, a picture or slice of video may become an MFU.

A single MFU or a group of a plurality of MFUs that may be independently delivered and decoded generate an MPU. Non-timed media that may be independently delivered and executed also generates an MPU. An MPU describes an internal structure, such as the arrangement and pattern of an MFU, thus enabling rapid access to and the partial consumption of the MFU.

The E.2 layer encapsulates an MPU generated by the E.3 layer and generates an MMT asset.

A sequence of MPUs from the same source component generates an MMT asset. An MMT asset is packaged to a MMT package, differently configured according to Composition Information (CI) and Transport Characteristics (TC), multiplexed with other MMT assets in accordance with an MMT payload format, and delivered in accordance with a MMT protocol.

An MMT asset is a data entity formed of a single MPU or a plurality of MPUs from a single data source and is a data unit in which Composition Information (CI) and Transport Characteristics (TC) are defined. An MMT asset may correspond to Packetized Elementary Streams (PES) and may correspond to, for example, video, audio, program information, an MPEG-U widget, a JPEG image, an MPEG 4 file format, an MPEG Transport Stream (M2TS), etc.

The E.1 layer encapsulates an MMT asset generated by the E.2 layer and generates a MMT package.

An MMT asset is packaged with MMT-CI for a subsequent response from the same user experience along with or separately from other function areas—a transport area and a signal area—. The MMT package is also packaged with Transport Characteristics on which a proper delivery method for each MMT asset is selected so that quality of experience of the MMT asset is satisfied.

A MMT package, together with supplementary information, such as Composition Information (CI) and Transport Characteristics (TC), may be formed of one MMT asset or a plurality of MMT assets. The MMT package may correspond to the program of an MPEG-2 TS.

Composition Information (CI) includes information about a relationship between MMT assets. If a single piece of content is formed of a plurality of MMT packages, the Composition Information may further include information for indicating a relationship between the plurality of MMT packages.

Transport Characteristics (TC) may include Transport Characteristics information necessary to determine the delivery conditions of an MMT asset or MMT packet and may include, for example, a traffic description parameter and a QoS descriptor.

The D-layer defines the application layer protocol and format of a payload. The payload format is defined to deliver coded media data irrespective of a media type or an encoding method.

The D-layer may perform network flow multiplexing, network packetization, and QoS control of media that is delivered, for example, over a network.

The D-layer is responsible for the multiplexing and packet-level aggregation and/or fragmentation of media, such as video and audio transmitted over a network, network packetization, QoS control, and synchronization functions, and an interface with the transport layer, such as an existing RTP, the transport layer, such as existing UDP and TCP, the E-layer, and the S layer, between the transport layer and the E-layer.

The D-layer identifies different types of payloads from the E-layer in order to handle the payloads from the E-layer.

The D-layer may handle a temporal relationship between packets that are delivered over different networks and through different channels. The synchronization function may include hybrid network synchronization using a timestamp, etc.

The D-layer may handle the timing constraints of MMT delivery packets for real-time media delivery.

The D-layer may perform error control of an MMT media packet, such as forward error correction and retransmission.

The D-layer may perform flow control of an MMT media packet.

The D-layer may perform an interaction with other MMT layers in addition to lower layers (MAC, PHY) through the cross-layer design in order to maintain a specific level of QoS for the delivery of an MMT media packet.

Furthermore, the D-layer may provide a function for performing group communication.

As shown in FIG. 1, the D-layer may include an MMT D.1 layer, an MMT D.2 layer, and an MMT D.3 layer.

The D.1 layer receives a MMT package generated by the E.1 layer and generates a MMT payload format. The MMT payload format is a payload format for delivering an MMT asset and delivering information for consumption in accordance with an existing other application transport protocol, such as a MMT application protocol or RTP. The MMT payload may include the fragment of an MFU along with information, such as AL-FEC.

The D.2 layer receives a MMT payload format generated by the D.1 layer and generates a MMT transport packet or a MMT packet. The MMT transport packet or the MMT packet is a data format used in an application transport protocol for the MMT.

The D.3 layer supports QoS by providing a function capable of exchanging pieces of information between layers through the cross-layer design. For example, the D.3 layer may perform QoS control using the QoS parameters of the MAC/PHY layer. For example, a bit rate, a packet loss ratio, expected delay, and an available buffer size may become the QoS parameters of the MAC/PHY layer.

The S layer performs a signaling function. The S layer may perform, for example, the session initialization/control/management of delivered media, trick mode based on a server and/or a client, service discovery, synchronization, and a signaling function for an interface function between other layers, that is, the D-layer and the E-layer. The synchronization may include synchronization control in a hybrid network.

The S layer defines the formats of messages which manage the delivery and consumption of a MMT package. The message for consumption management is used to deliver the structure of a MMT package, and the message for delivery management is used to deliver the structure of a payload format and the construction of a protocol.

As shown in FIG. 1, the S layer may include an MMT S.1 layer and an MMT S.2 layer.

The S.1 layer may perform service discovery, media session initialization/termination, media session presentation/control, an interface function with the D layer and the E layer, etc. The S.1 layer may define the format of control messages between applications for media presentation session management. The presentation session management may define the formats of control messages that are exchanged between applications in order to provide information required for media presentation, session management, and media consumption.

The S.2 layer may perform delivery session management. The delivery session management may define the formats of control messages exchanged between the delivery end-points of the D-layer regarding flow control, delivery session management, delivery session monitoring, error control, and hybrid network synchronization control.

The S.2 layer may include delivery session establishment and release, delivery session management (e.g., delivery session monitoring, flow control, and error control), resource reservation for a set delivery session, signaling for synchronization under a complex delivery environment, and signaling for adaptive delivery in order to support the operations of the D-layer. The S.2 layer may provide signaling necessary between a sender and a receiver. That is, the S.2 layer may provide necessarily signaling between a sender and a receiver in order to support the above mentioned operations of the D-layer. Furthermore, the S.2 layer may be responsible for an interface function with the D-layer and the E-layer.

A control message (or control information) may be generated by the signaling layer (S-layer) and be transmitted over a broadcast network and/or a broadband network.

If a control message is transmitted over both a broadcast network and a broadband network, the function of the control message transmitted over the broadcast network may be identical with the function of the control message transmitted over the broadband network. The syntax and format of a control message may be different depending on applications and the type of delivery. For example, in the case of hybrid delivery, the same common control information and the same common format may be used in control messages transmitted over a broadcast network and a broadband network. Alternatively, in the case of hybrid delivery, the same common control information (common control information) may be transmitted in different formats over a broadcast network and a broadband network respectively. Alternatively, in the case of hybrid delivery, different pieces of control information may be transmitted in different formats and as different control information over a broadcast network and a broadband network.

Figure 2:
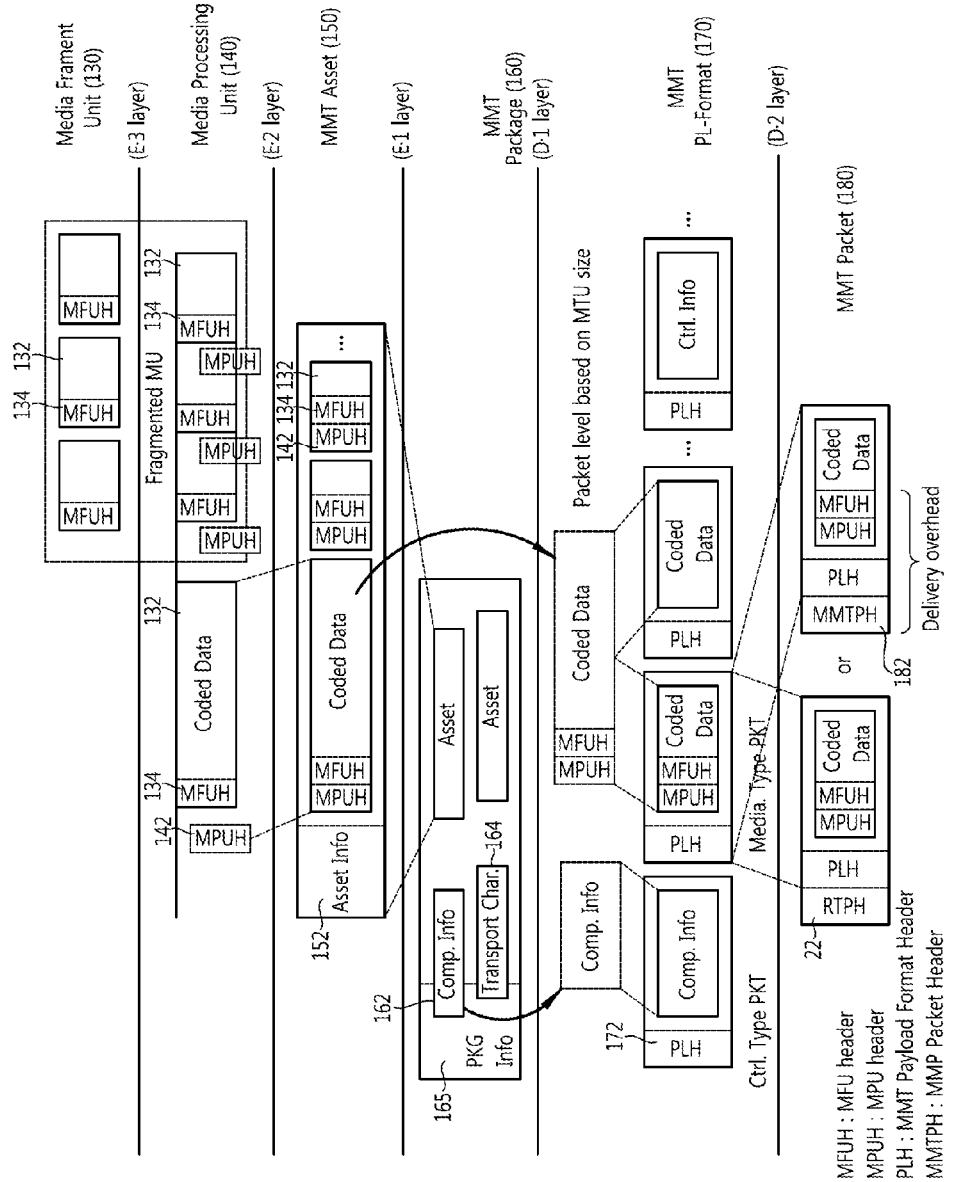
FIG. 2 shows the format of unit information (or data or a packet) used in each layer of the MMT hierarchical structure of FIG. 1.

FIG. 2 shows the format of unit information (or data or a packet) used in each layer of the MMT hierarchical structure of FIG. 1.

A Media Fragment Unit (MFU) defines a format on which a transport layer encapsulates the portion of an AU in order to perform adaptive delivery in the range of the MFU. The MFU may be used to deliver a specific format of coded media so that the portion of the AU is independently decoded or discarded.

The MFU 130 includes coded media fragment data 132 and a Media Fragment Unit Header (MFUH) 134. The MFU 130 has a general container format independent from a specific codec and carries the smallest data unit that may be independently consumed by a media decoder. The MFUH 134 may include supplementary information, such as media characteristics, for example, a loss tolerance. For example, the picture or slice of video may become the MFU 130.

The MFU has an identifier for distinguishing one MFU from other MFUs and includes common relationship information between MFUs within a single AU. A dependent relationship between the MFUs in a single AU is described, and prioritization related to the MFUs is described as the part of such pieces of information. The information may be used to handle delivery in a lower transport layer. For example, in a transport layer, the delivery of MFUs that may be discarded may be omitted in order to support the delivery of QoS in an insufficient bandwidth.

The MPU is a set of MFUs including a plurality of the MFUs 130. The MPU has a general container format independently from a specific codec and includes media data equivalent to an access unit. The MPU may have a timed data unit or a non-timed data unit. The MPU may include a Media Processing Unit Header (MPUH) having MFU data and supplementary information, such as a timestamp for synchronization.

The MPU is data processed by an entity that complies with the MMT independently and completely, and the processing includes encapsulation and packetization. The MPU may be formed of at least one MFU or may have the part of data having a format defined by another standard.

A single MPU may accommodate the integral number of at least one AU or non-timed data. For the timed data, the AU may be delivered by at least one MFU, but a single AU cannot be fragmented into a plurality of MPUs. In non-timed data, a single MPU accommodates the part of non-timed data processed by an entity that complies with the MMT independently and completely.

The MPU may be uniquely identified by a sequence number and an asset ID, associated with the MPU and used to distinguish the MPU from other MPUs, within a MMT package.

The MPU has at least one random access point. The first byte of an MPU payload may always start from a random access point. In timed data, the fact means that the decoding sequence of the first MFU is always 0 in an MPU payload. In timed data, the presentation duration and decoding sequence of each AU may be sent to be indicative of a presentation time. The MPU does not have its own initial presentation time, and the presentation time of the first AU of a single MPU may be described in Composition Information (CI). The Composition Information (CI) may specify the first presentation time of the MPU.

The MMT asset 150 is a set of MPUs formed of a plurality of MPUs. The MMT asset 150 is a data entity made up of a plurality of MPUs (timed or non-time data) from a single data source, and MMT asset information 152 may include asset packaging metadata and supplementary information, such as a data type. The MMT asset 150 may include, for example, video, audio, program information, an MPEG-U widget, a JPEG image, an MPEG 4 File Format (FF), Packetized Elementary Streams (PES), and an MPEG Transport Stream (M2TS).

Furthermore, the MMT asset may be a logical data entity having coded media data. The MMT asset has an MMT asset header and coded media data. The coded media data may be a group of MPUs that are collectively referred by the same MMT asset ID. The data of a type that is consumed by an entity directly related to an MMT client may be a separated MMT asset. Such data types may include, for example, a MPEG-2 TS, a PES, a MP4 file, a MPEG-U widget package, and a JPEG file.

The coded media of the MMT asset may be timed data or non-timed data. The timed data is audiovisual media data that needs the synchronized decoding and presentation of specific data on a designated time. The non-timed data is the data of a data type that may be decoded and provided on a specific time in response to the providing of service or a user interaction.

A service provider may generate multimedia service by aggregating MMT assets in the state in which the MMT assets are placed on a space-time axis.

The MMT package 160 is one MMT asset or a set of MMT assets including one or more MMT assets 150. MMT assets within a MMT package may be multiplexed or may be concatenated like a chain.

The MMT package is a container format for an MMT asset and configuration information. The MMT package provides the repository of an MMT asset for a MMT program and configuration information.

An MMT program provider encapsulates coded data as an MMT asset, describes the temporal and spatial layout of the MMT assets and Transport Characteristics (TC) thereof, and generates configuration information. An MU and an MMT asset may be directly delivered in the form of the D.1 payload format. The configuration information may be delivered by an S.1 presentation session management message. However, a MMT program provider and a client that permit the relay or subsequent reuse of a MMT program store the configuration information in the form of a MMT package format.

In parsing a MMT package, a MMT program provider determines that an MMT asset may provide a client with what transport path (e.g., broadcast or broadband). Configuration information in a MMT package is delivered as a S.1 presentation session management message along with delivery-related information.

The client receives the S.1 presentation session management message and knows what MMT program is possible and how an MMT asset for a corresponding MMT program is received.

A MMT package may also be delivered in accordance with the D.1 payload format. The MMT package is packetized in accordance with the D.1 payload format and delivered. A client receives the packetized MMT package and configures part of or the entire MMT package. In this case, the client consumes an MMT program.

The package information 165 of the MMT package 160 may include configuration information. The configuration information may include supplementary information, such a list of MMT assets, package ID information, Composition Information (CI) 162, and Transport Characteristics (TC) 164. The Composition Information (CI) 162 includes information about a relationship between the MMT assets 150.

The Composition Information (CI) 162 may further include information indicative of a relationship between a plurality of MMT packages if a single piece of content is formed of a plurality of MMT packages. The Composition Information (CI) 162 may include information about a temporal, spatial, and adaptive relationship within a MMT package.

Like information that helps the delivery and presentation of a MMT package, the Composition Information (CI) in the MMT provides information about a spatial and temporal relationship between MMT assets within a MMT package.

The MMT-Composition Information (CI) is a descriptive language that is extended from HTML5 and provides such information. If HTML5 has been designed to describe the page-based presentation of text-based content, the MMT-CI chiefly presents a spatial relationship between sources. In order to support presentation indicative of a temporal relationship between MMT assets, the MMT-CI may be extended to have information related to an MMT asset within a MMT package, such as presentation resources, time information that determines the delivery and consumption sequence of MMT assets, and the additional attributes of media elements which consume various types of MMT assets in HTML5.

The Transport Characteristics (TC) information 164 includes information about Transport Characteristics (TC) and may provide information necessary to determine delivery conditions on each MMT asset (or a MMT package). The TC information may include a traffic description parameter and a QoS descriptor.

The traffic description parameter may include information about the bit rate of an MFU 130 or an MPU, information about the priority of an MFU 130 or an MPU, etc. The bit rate information may include, for example, information regarding whether an MMT asset is a Variable Bit Rate (VBR) or a Constant Bit Rate (CBR), a bit rate guaranteed, for an MFU (or an MPU), and a maximum bit rate of an MFU (or an MPU). The traffic description parameter may be used for resources reservation between servers, clients, and other elements on a delivery path, and it may include, for example, information about a maximum size of an MFU (or an MPU)

within an MMT asset. The traffic description parameter may be updated periodically or aperiodically.

A QoS descriptor includes information for QoS control and may include, for example, delay information and loss information. The loss information may include, for example, a loss indicator regarding whether or not the delivery loss of an MMT asset is permitted. For example, the loss information may indicate 'lossless' if the loss indicator is '1' and may indicate 'lossy' if the loss indicator is '0'. The delay information may include a delay indicator used to distinguish the sensitivity of delivery delay of an MMT asset. The delay indicator may indicate whether the type of MMT asset is conversational, interactive, real-time, or non-real-time.

A single piece of content may be made up of a single MMT package. Alternatively, a single piece of content may be made up of a plurality of MMT packages.

If a single piece of content is made up of a plurality of MMT packages, composition information or configuration information indicative of a temporal, a spatial, adaptive relationship between the plurality of MMT packages may be present within a single MMT package that belongs to the MMT packages or may be present outside the MMT packages.

For example, in the case of hybrid delivery, some of content components may be delivered over a broadcast network, and the remaining parts of the content components may be delivered over a broadband network. For example, in the case of a plurality of AV streams that forms a single multi-view service, a single stream may be delivered over a broadcast network, the remaining streams may be delivered over a broadband network, and the AV streams may be multiplexed, individually received by a client terminal, and stored. Alternatively, for example, application software, such as a widget, may be delivered over a broadband network, and an AV stream (or an AV program) may also include a scenario that is delivered over an existing broadcast network.

In the case of such a multi-view service scenario and/or a widget scenario, all of a plurality of AV streams may become a single MMT package. In such a case, one of the plurality of AV streams may be stored only in a single client terminal, the storage content becomes the part of the MMT package, the client terminal needs to rewrite composition information or configuration information, and the rewritten content becomes a new MMT package not related to a server.

In the case of such a multi-view service scenario and/or a widget scenario, each AV stream may become a single MMT package. In such a case, a plurality of MMT packages forms a single piece of content, the plurality of MMT packages is recorded in storage in a MMT package unit, and composition information or configuration information indicative of a relationship between the MMT packages is required.

Composition information or configuration information included in a single MMT package may refer to an MMT asset within another MMT package and also may present the outside of a MMT package that refers to a MMT package in an out-band situation.

Examples of MMT package configurations in accordance with embodiments of the present invention are described below with reference to FIGS. 3 to 10.

Hybrid delivery over a broadcast network and a broadband network are hereinafter illustrated, but the scope of the present invention is not limited to hybrid delivery over a broadcast network and a broadband network. A hybrid delivery method in accordance with an embodiment of the present invention may include a plurality of networks that belong to various networks, including a broadcast network, a broadband network, a cable network, and a satellite communication network.

Furthermore, an MMT asset has been chiefly described in order to describe the configuration of a MMT package, but a hybrid delivery method in accordance with an embodiment of the present invention is not limited to the delivery of an MMT asset unit and the hybrid delivery method may be performed in a sub-stream unit, an MFU, an MPU, an MMT package unit, or an MMT packet unit. In such a case, in order to construct the delivery unit, sub-streams, MFUs, MPUs, MMT packages, or MMT packets may be fragmented and aggregated. Furthermore, if video content is formed of a plurality of layers, such as a first layer and a second layer, hybrid delivery may be performed for each layer unit.

Figure 3:
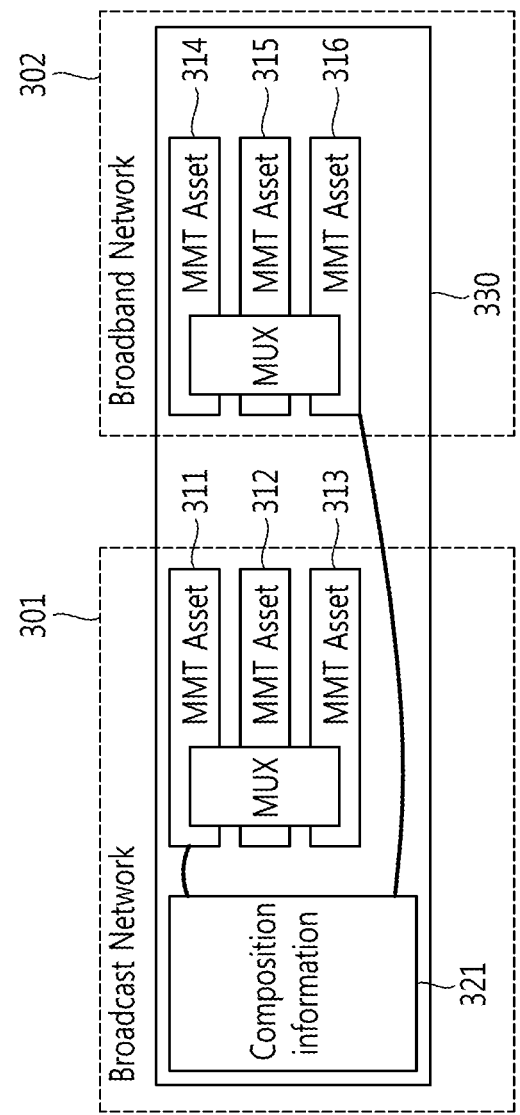
FIG. 3 shows a first exemplary diagram of a MMT package construction in accordance with an embodiment of the present invention.

FIG. 3 shows a first exemplary diagram of a MMT package construction in accordance with an embodiment of the present invention.

The first exemplary diagram illustrates a case where a single piece of content is made up of a single MMT package. As shown in FIG. 3, MMT assets 311, 312, and 313, that is, some of content components, may be delivered over a broadcast network 301, and MMT assets 314, 315, and 316, that is, the remaining parts of the content components, may be delivered over a broadband network 302. In this case, the MMT assets 311, 312, and 313 delivered over the broadcast network may be multiplexed, and the MMT assets 314, 315, and 316 delivered over the broadband network may also be multiplexed.

In this case, the MMT assets 311, 312, 313, 314, 315, and 316, that is, all the content components that form the single piece of content, may be entirely included in a single MMT package 331. Furthermore, composition information 321 between the MMT assets 311, 312, 313, 314, 315, and 316 may be included in the MMT package 331.

Figure 4:
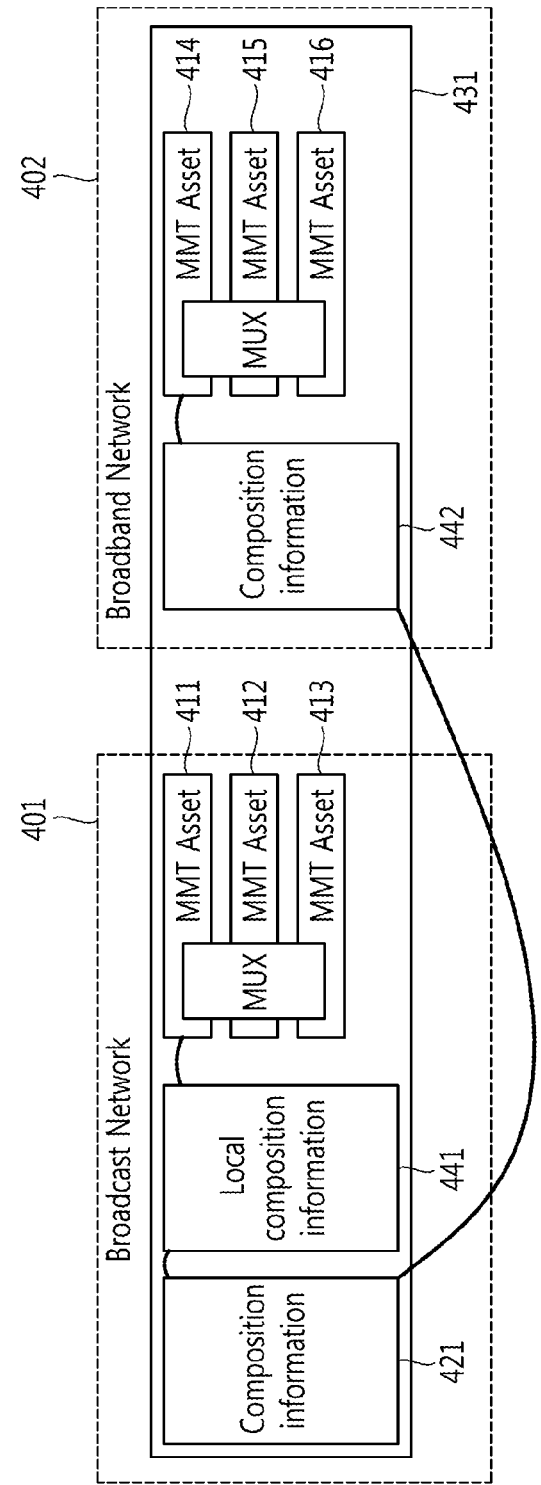
FIG. 4 shows a second exemplary diagram of a MMT package construction in accordance with an embodiment of the present invention.

FIG. 4 shows a second exemplary diagram of a MMT package construction in accordance with an embodiment of the present invention.

The second exemplary diagram illustrates a case where a single piece of content is made up of a single MMT package and includes local composition information. As shown in FIG. 4, MMT assets 411, 412, and 413, that is, some of content components, may be delivered over a broadcast network 401, and MMT assets 414, 415, and 416, that is, the remaining parts of the content components, may be delivered over a broadband network 402. In this case, the MMT assets 411, 412, and 413 delivered over the broadcast network may be multiplexed, and the MMT assets 414, 415, and 416 delivered over the broadband network may also be multiplexed.

The MMT assets 411, 412, 413, 414, 415, and 416, that is, all the content components that form the single piece of content, may be entirely included in a single MMT package 431. In this case, the MMT package 431 may include local composition information 441 indicative of a relationship between the MMT assets 411, 412, and 413 delivered over the broadcast network, local composition information 442 indicative of a relationship between the MMT assets 414, 415, and 416 delivered over the broadband network, and the composition information 421 indicative of a relationship between the local composition information 441 and the local composition information 442.

Figure 5:
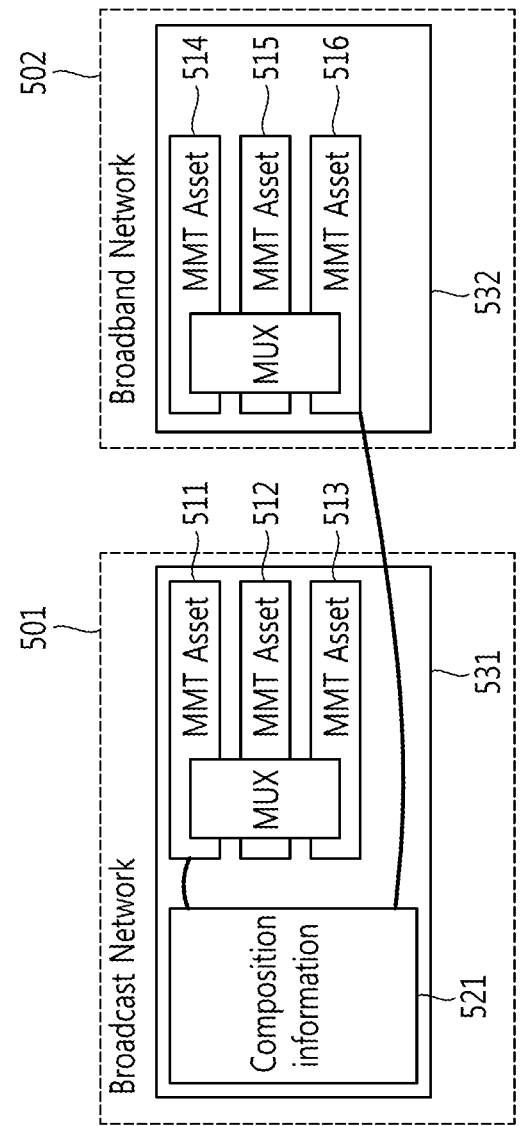
FIG. 5 shows a third exemplary diagram of a MMT package construction in accordance with an embodiment of the present invention.

FIG. 5 shows a third exemplary diagram of a MMT package construction in accordance with an embodiment of the present invention.

The third exemplary diagram illustrates a case where a single piece of content is made up of a plurality of MMT packages. As shown in FIG. 3, MMT assets 511, 512, and 513, that is, some of content components, may be delivered over a broadcast network 501, and MMT assets 514, 515, and 516, that is, the remaining parts of the content components, may be delivered over a broadband network 502. In this case, the MMT assets 511, 512, and 513 delivered over the broadcast network may be multiplexed, and the MMT assets 514, 515, and 516 delivered over the broadband network may also be multiplexed.

In this case, the MMT assets 511, 512, and 513 that are some of the content components may be included in one MMT package 531, and the MMT assets 514, 515, and 516 that are the remaining parts of the content components may be included in the other MMT package 532. That is, the single piece of content may be made up of the plurality of MMT packages 531 and 532. Furthermore, composition information 521 indicative of a relationship between the MMT packages 531 and 532 may be included in either the MMT package 531 or the MMT package 532.

Figure 6:
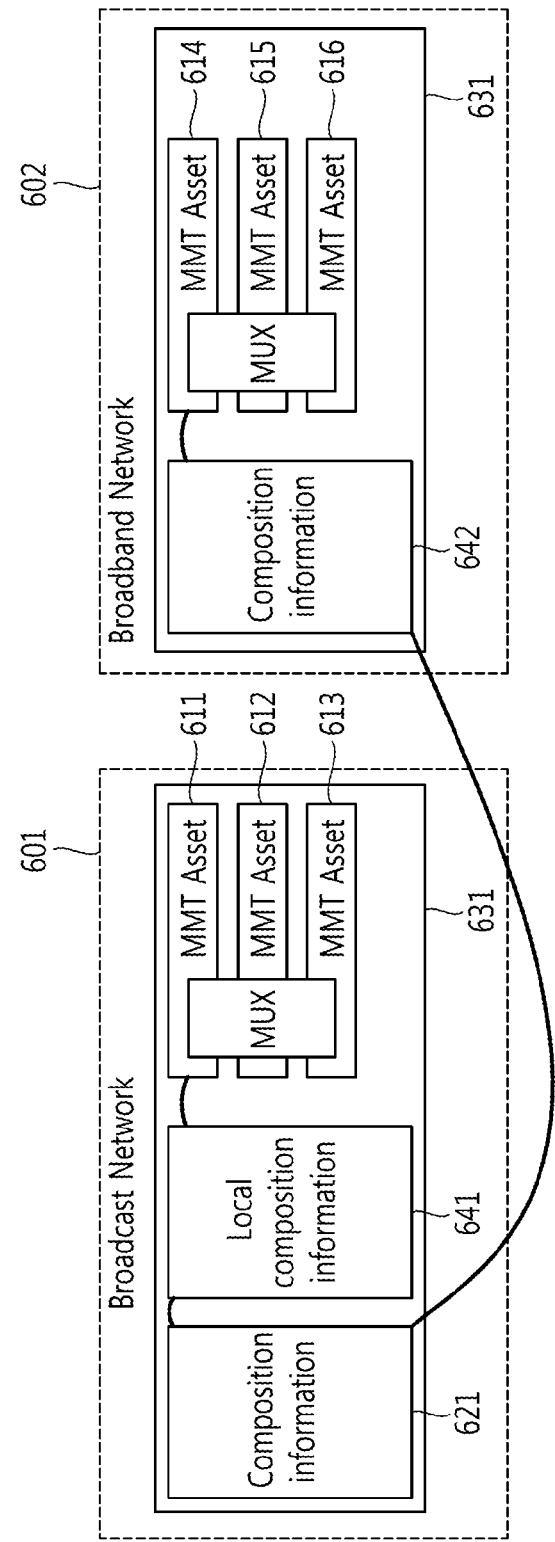
FIG. 6 shows a fourth exemplary diagram of a MMT package construction in accordance with an embodiment of the present invention.

FIG. 6 shows a fourth exemplary diagram of a MMT package construction in accordance with an embodiment of the present invention.

The fourth exemplary diagram illustrates a case where a single piece of content is made up of a plurality of MMT packages and includes local composition information. As shown in FIG. 6, MMT assets 611, 612, and 613, that is, some of content components, may be delivered over a broadcast network 601, and MMT assets 614, 615, and 616, that is, the remaining parts of the content components, may be delivered over a broadband network 602. In this case, the MMT assets 611, 612, and 613 delivered over the broadcast network may be multiplexed, and the MMT assets 614, 615, and 616 delivered over the broadband network may also be multiplexed.

Meanwhile, the MMT assets 611, 612, and 613 that are some of the content components may be included in one MMT package 631, and the MMT assets 614, 615, and 616 that are the remaining parts of the content components may be included in the other MMT package 632. That is, the single piece of content may be made up of the plurality of MMT packages 631 and 632.

In this case, the MMT package 631 may include local composition information 641 indicative of a relationship between the MMT assets 611, 612, and 613 delivered over the broadcast network, and the MMT package 632 may include local composition information 642 indicative of a relationship between the MMT assets 614, 615, and 616 delivered over the broadband network. Furthermore, composition information 621 indicative of a relationship between the pieces of local composition information 641 and 642 may be included in either the MMT package 631 or the MMT package 632.

Figure 7:
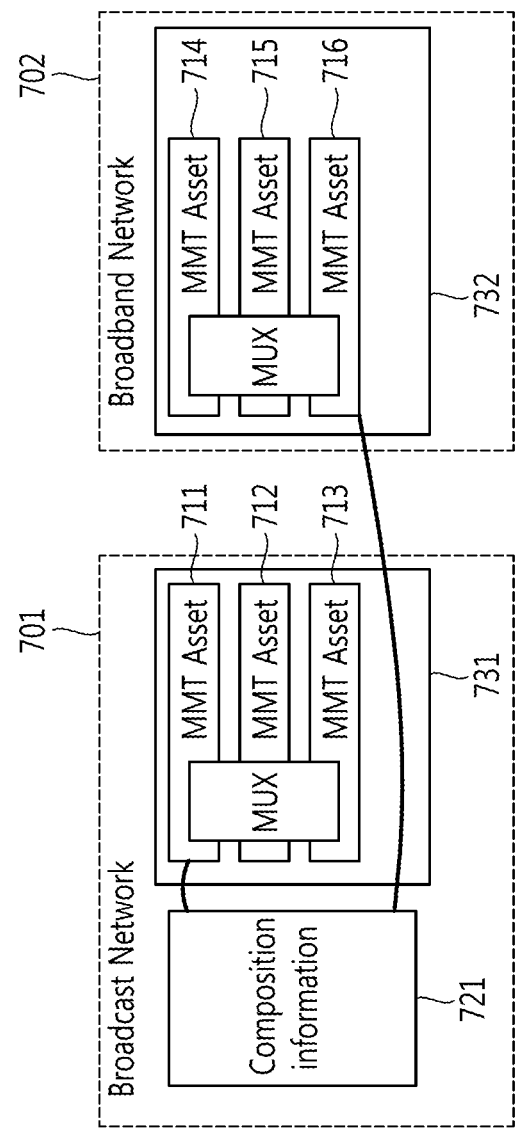
FIG. 7 shows a fifth exemplary diagram of a MMT package construction in accordance with an embodiment of the present invention.

FIG. 7 shows a fifth exemplary diagram of a MMT package construction in accordance with an embodiment of the present invention.

The fifth exemplary diagram illustrates a case where a single piece of content is made up of a plurality of MMT packages. As shown in FIG. 7, MMT assets 711, 712, and 713, that is, some of content components, may be delivered over a broadcast network 701, and MMT assets 714, 715, and 716, that is, the remaining parts of the content components, may be delivered over a broadband network 702. In this case, the MMT assets 711, 712, and 713 delivered over the broadcast network may be multiplexed, and the MMT assets 714, 715, and 716 delivered over the broadband network may also be multiplexed.

In this case, the MMT assets 711, 712, and 713 that are some of content components may be included in one MMT package 731, and the MMT assets 714, 715, and 716 that are the remaining parts of the content components may be included in the other MMT package 732. That is, the single piece of content may be made up of the plurality of MMT packages 731 and 732. Furthermore, composition information 721 indicative of a relationship between the MMT packages 731 and 732 may be present outside the MMT packages 731 and 732.

Figure 8:
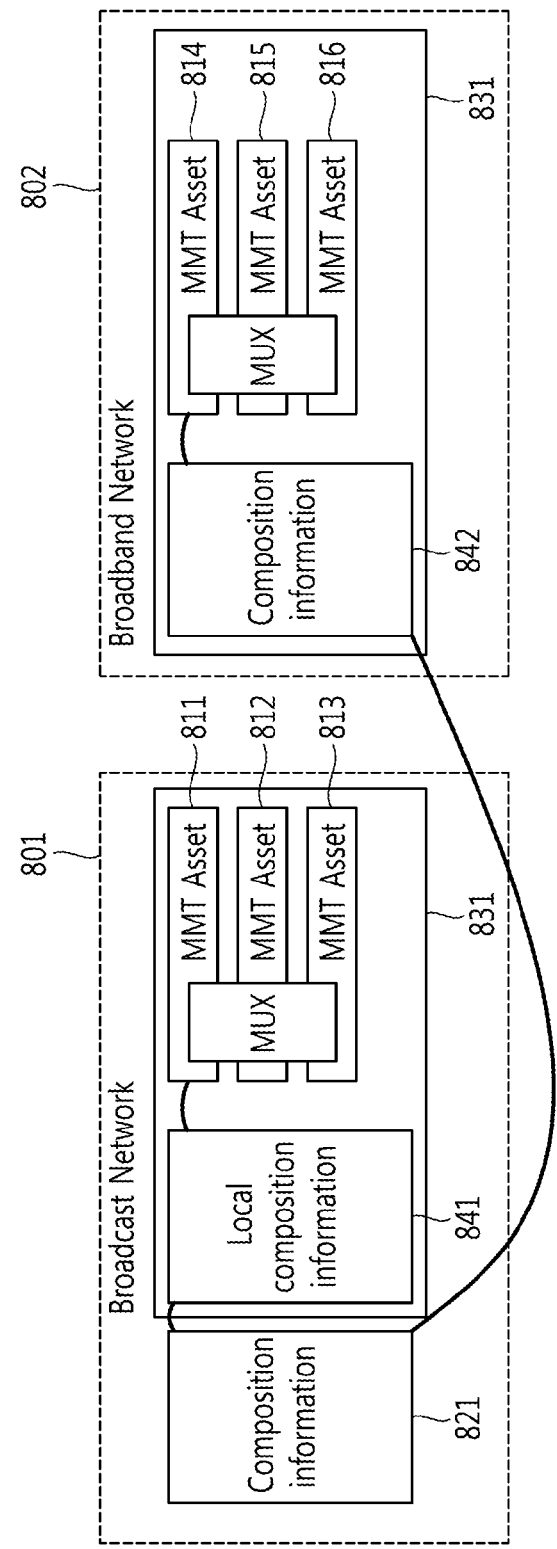
FIG. 8 shows a sixth exemplary diagram of a MMT package construction in accordance with an embodiment of the present invention.

FIG. 8 shows a sixth exemplary diagram of a MMT package construction in accordance with an embodiment of the present invention.

The sixth exemplary diagram illustrates a case where a single piece of content is made up of a plurality of MMT packages and includes local composition information. As shown in FIG. 8, MMT assets 811, 812, and 813, that is, some of content components, may be delivered over a broadcast network 801, and MMT assets 814, 815, and 816, that is, the remaining parts of the content components, may be delivered over a broadband network 802. In this case, the MMT assets 811, 812, and 813 delivered over the broadcast network may be multiplexed, and the MMT assets 814, 815, and 816 delivered over the broadband network may also be multiplexed.

The MMT assets 811, 812, and 813 that are some of the content components may be included in one MMT package 831, and the MMT assets 814, 815, and 816 that are the remaining parts of the content components may be included in the other MMT package 832. That is, the single piece of content may be made up of the plurality of MMT packages 831 and 832.

In this case, the MMT package 831 may include local composition information 841 indicative of a relationship between the MMT assets 811, 812, and 813 delivered over the broadcast network, and the MMT package 832 may include local composition information 842 indicative of a relationship between the MMT assets 814, 815, and 816 delivered over the broadband network. Furthermore, composition information 821 indicative of a relationship between the pieces of local composition information 841 and 842 may be present outside the MMT packages 831 and 832.

As described above, the hybrid delivery cases using a broadcast network and a broadband network have been illustrated, but a hybrid delivery method in accordance with an embodiment of the present invention may include a plurality of networks that belong to various types of networks, including a broadcast network, a broadband network, a cable network, and a satellite communication network. Furthermore, the present invention may also be applied to various package constructions in which a single MMT package forms a single piece of content or a plurality of MMT packages forms a single piece of content in relation to three or more various types of delivery means without being limited to the two delivery means.

Figure 9:
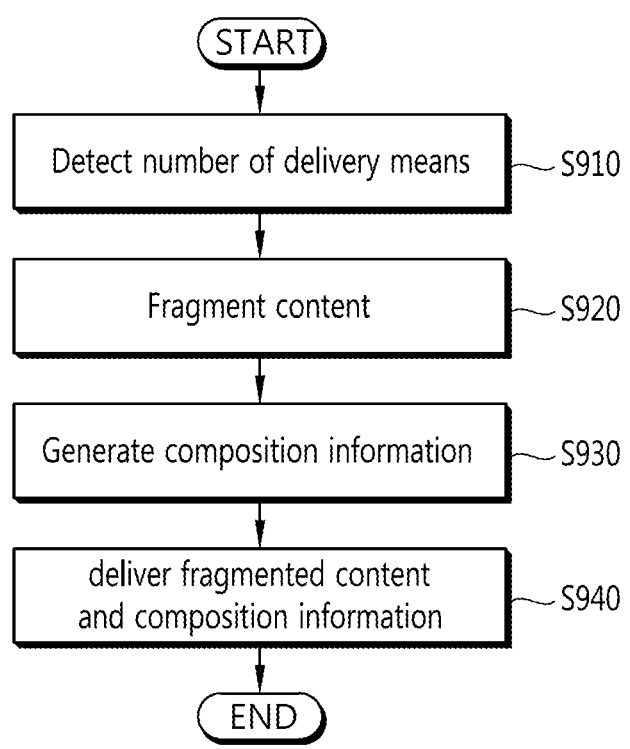
FIG. 9 is a flowchart illustrating a hybrid delivery method in accordance with an embodiment of the present invention.

FIG. 9 is a flowchart illustrating a hybrid delivery method in accordance with an embodiment of the present invention.

As described above, hybrid delivery is made possible through various types of heterogeneous delivery means, and various types of delivery means including a cable network or a satellite communication network in addition to a broadcast network or a broadband network have been developed. Accordingly, there is a need for a content hybrid delivery method having optimum delivery efficiency using delivery means to a maximum extent by detecting the number of pieces of delivery means through which content may be delivered from a server to a client according to a current situation, of various types of delivery means, fragmenting the content so that the content corresponds to the number of pieces of detected delivery means, and generating and delivering information indicative of a relationship between the pieces of fragmented content in various ways.

As shown in FIG. 9, the content hybrid delivery method in accordance with an embodiment of the present invention may include step S910 of detecting the number of pieces of delivery means through which a server may deliver content to a client, step S920 of fragmenting the content so that the content corresponds to the number of detected delivery means, step S930 of generating composition information about the pieces of fragmented content, and step S940 of delivering the pieces of fragmented content and the composition information to the client using the delivery means. Step S910 of detecting, by the server, the number of pieces of delivery means through which the content may be transmitted to the client is an optional step and may be omitted. If step S910 of detecting, by the server, the number of pieces of delivery means through which the content may be transmitted to the client is omitted, step S920 of fragmenting the content so that the content corresponds to the number of detected delivery means is performed as step of fragmenting the content in a specific number.

At step S910 of detecting, by the server, the number of pieces of delivery means through which the content may be transmitted to the client, the number of pieces of delivery means is detected by detecting all pieces of delivery means that may be used to deliver the content. A plurality of networks that belong to various types of networks, including a broadcast network, a broadband network, a cable network, and a satellite communication network, may be selected as the delivery means. Furthermore, the characteristics of each piece of delivery means, such as a transfer rate, may also be detected in addition to the number of pieces of delivery means.

At step S920 of fragmenting the content so that the content corresponds to the number of detected delivery means, the content may be fragmented so that the content corresponds to the number of detected delivery means. If the content is fragmented so that the content corresponds to the number of delivery means, but the characteristics of each piece of the delivery means are detected at step S910, the content may be fragmented based on the characteristics of the delivery means and the number of pieces of delivery means. The pieces of fragmented content may be audio information, video information, supplementary data information, or widget information. The audio information, video information, supplementary data information, or widget information may be included in each piece of the fragmented content or may be included in a plurality of pieces of fragmented content.

In this case, the content may include at least one MMT asset. The pieces of fragmented content may include the same number of MMT assets or may include a different number of MMT assets based on the characteristics of delivery means. Furthermore, all the pieces of fragmented content may form a single MMT package, or the pieces of fragmented content may form different MMT packages.

Alternatively, the content may be fragmented into a sub-stream unit, an MFU, an MPU, an MMT package unit, or an MMT packet unit in addition to an MMT asset unit. If video content is made up of a plurality of layers, such as a first layer and a second layer, the video content may be fragmented into a layer unit. The same number of MMT assets, sub-streams, MFUs, MPUs, MMT packages, or MMT packets may be included in each of pieces of fragmented content, or a different number of MMT assets, sub-streams, MFUs, MPUs, MMT packages, or MMT packets may be included in each of pieces of fragmented content based on the characteristics of delivery means.

At step S930 of generating composition information about the pieces of fragmented content, the composition information indicative of a relationship between the pieces of fragmented content may be generated. If each of the pieces of fragmented content forms a single MMT package at step S920 of fragmenting the content, the composition information may indicate a relationship between the formed MMT packages. Furthermore, the generated composition information may be included in any one of the formed MMT packages or may be separately present. Referring to FIG. 2, the composition information 162 may be included in the package information 165 of an MPEG Media Transport (MMT) package, as shown in FIG. 2.

If the content is fragmented into a sub-stream unit, an MFU, an MPU, an MMT package unit, an MMT packet unit, or a layer unit at step S920 of fragmenting the content, the composition information may indicate a relationship between the pieces of fragmented content. Furthermore, the composition information may be included the header 182 of a MMT packet or a payload in addition to the package information 165, may be included in the unit information of another MMT hierarchical structure, or may be present through a separate construction.

More particularly, referring back to FIGS. 3 to 8, as shown in FIG. 3, all the pieces of fragmented content may form the single MMT package 331, and the composition information 321 indicative of a relationship between the pieces of fragmented content may be included in the MMT package 331.

Furthermore, as shown in FIG. 4, all the pieces of fragmented content may form the single MMT package 431, and the pieces of local composition information 441 and 442, each indicating a relationship between the MMT assets included in each of the pieces of fragmented content, and the composition information 421 indicative of a relationship between the pieces of local composition information 441 and 442 may be included in the MMT package 431.

Furthermore, as shown in FIG. 5, the pieces of fragmented content may form the respective MMT packages 531 and 532, and the composition information 521 indicative of a relationship between the MMT packages 531 and 532 may be included in the MMT package 531, that is, any one of the MMT packages 531 and 532.

Furthermore, as shown in FIG. 6, the pieces of fragmented content may form the respective MMT packages 631 and 632, and the MMT packages 631 and 632 may include the respective pieces of local composition information 641 and 642 each indicative of a relationship between the MMT assets included in each of the MMT packages 631 and 632. Furthermore, the composition information 621 indicative of a relationship between the pieces of local composition information 641 and 642 may be included in the MMT package 631, that is, any one of the MMT packages 631 and 632.

Furthermore, as shown in FIG. 7, the pieces of fragmented content may form the respective MMT packages 731 and 732, and the composition information 721 indicative of a relationship between the MMT packages 731 and 732 may be present outside the MMT packages 731 and 732.

Furthermore, as shown in FIG. 8, the pieces of fragmented content may form the respective MMT packages 831 and 832, and the MMT packages 831 and 832 may include the respective pieces of local composition information 841 and 842 each indicative of a relationship between the MMT assets included in each of the MMT packages 831 and 832. Furthermore, the composition information 821 indicative of a relationship between the pieces of local composition information 841 and 842 may be present outside the MMT packages 831 and 832.

A case where content has been fragmented on the basis of an MMT asset has been illustrated above, but the content may be fragmented into a sub-stream unit, an MFU, an MPU, an MMT package unit, or an MMT packet unit in addition to as an MMT asset as described above.

At step S940 of delivering the pieces of fragmented content, the pieces of fragmented content are transmitted to the client using the delivery means. If the composition information is present outside the MMT package, the pieces of fragmented content and the composition information are transmitted to the client using the delivery means. If the content has been fragmented by taking the characteristics of the delivery means into consideration, each of the pieces of delivery means may deliver fragmented content corresponding to the characteristics of each of the pieces of delivery means.

Figure 10:
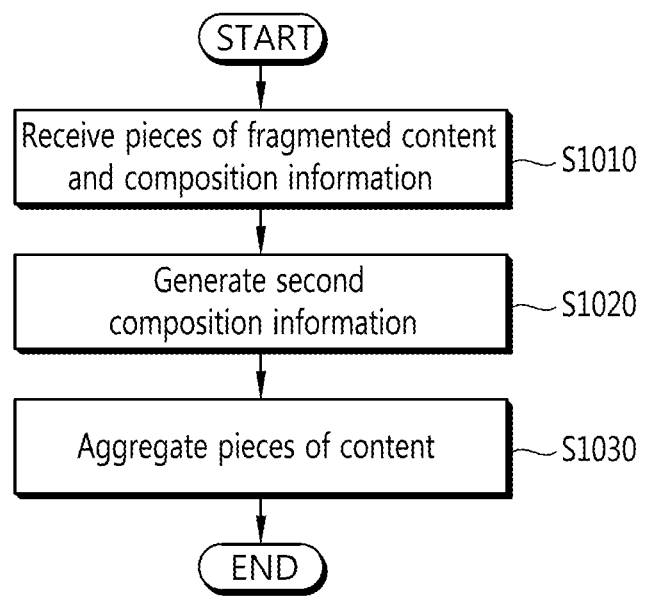
FIG. 10 is a flowchart illustrating a method of receiving content in accordance with an embodiment of the present invention.

FIG. 10 is a flowchart illustrating a method of receiving content in accordance with an embodiment of the present invention.

As shown in FIG. 10, the method of receiving content in accordance with an embodiment of the present invention may include step S1010 of receiving pieces of fragmented content from a server, step S1020 of generating second composition information, and step S1030 of aggregating the pieces of fragmented content based on the composition information or the second composition information At step of receiving the pieces of content and the composition information, pieces of fragmented content are received from the server (S1010). In this case, if the content has been fragmented by taking the characteristics of the delivery means into consideration, the pieces of fragmented content may be received using each piece of delivery means corresponding to the characteristics of each of the pieces of delivery means. At step S1010 of receiving the pieces of content, if the composition information is present outside MMT packages, the pieces of fragmented content and the composition information may be received.

If only some of the pieces of fragmented content are received, the client may generate the second composition information, indicating a relationship between the pieces of received fragmented content, based on the pieces of received fragmented content and the composition information (S1020). In this case, the pieces of fragmented content may be a sub-stream, an MMT asset, an MFU, an MPU, a MMT package, or a MMT packet.

At step S1030 of aggregating the pieces of content, the pieces of fragmented content are aggregated based on the composition information or the second composition information.

In accordance with the hybrid delivery method for MMT-packetized content and the method of receiving content in accordance with an embodiment of the present invention, the number of pieces of delivery means can be detected as far as possible, content may be fragmented so that the content corresponds to the number of pieces of delivery means, and the fragmented content may be transmitted and received. Accordingly, hybrid delivery having optimum delivery efficiency in various environments is possible.

What is claimed is:

1. A method for delivering content, the method comprising:
fragmenting content;
generating composition information for pieces of fragmented content; and
delivering the pieces of fragmented content to a client using delivery means,
wherein the pieces of fragmented content are encapsulated into Moving Picture Experts Group Media Transport (MMT) package including at least one MMT asset the composition information (CI), and transport characteristics (TC),
wherein the MMT asset is a logical data group of at least one media processing unit (MPU) sharing same asset identifier (asset ID), the MPU having an independently consumed format generated by encapsulating media fragment unit (MFU), the MFU being data processed by a media decoder,
wherein the composition information comprises information on a spatial and temporal relationship among the MMT assets,
wherein the composition information is configured based on an Hypertext Markup Language fifth version (HTML5) document,
wherein the composition information represents attributes of media elements related to the spatial and temporal relationship among the MMT assets by referencing corresponding attributes in the HTML5 document.

2. The method of claim 1, further comprising detecting, by a server, the number of delivery means through which the server is able to transmit the content to the client, wherein the number of fragmented content corresponds to the number of detected delivery means.

3. The method of claim 1, wherein the content comprises at least one of a sub-stream, an MMT asset, an MMT package, an MPU, an MFU, and an MMT packet.

4. The method of claim 1, wherein the composition information is included in at least one of package information of an MMT package, a header of an MMT packet, and a payload.

5. The method of claim 1, wherein all the pieces of fragmented content form a single MMT package.

6. The method of claim 1, wherein each of the pieces of fragmented content forms a single MMT package.

7. The method of claim 1, wherein the delivering the pieces of fragmented content comprises sending the pieces of fragmented content and the composition information to the client if the composition information is present outside the pieces of fragmented content.

8. The method of claim 1, wherein the MMT assets in the MMT package are transmitted through different transport means, wherein a local composition information describes relationship among the MMT assets in each transport means, wherein the composition information comprises information on relationship between the local composition information.

9. The method of claim 1, wherein a single MMT package is transmitted through different transport means, wherein the single MMT package comprises a local composition information describing relationship among MMT assets in each transport means, wherein the composition information comprises information on relationship between the local composition information.

10. The method of claim 1, wherein each of the pieces of fragmented content is transmitted through different transport means, wherein each of the pieces of fragmented content comprises a local composition information describing relationship among MMT assets in each transport means, wherein the composition information comprises information on relationship between the local composition information.

11. A method for receiving content, comprising:
receiving pieces of fragmented content from a server; and
aggregating the pieces of fragmented content based on composition information included in the pieces of fragmented contend,
wherein the pieces of fragmented content are encapsulated into Moving Picture Experts Group Media Transport (MMT) package including at least one MMT asset, the composition information (CI), and transport characteristics (TC), wherein the MMT asset is a logical data group of at least one media processing unit (MPU) sharing same asset identifier (asset ID), the MPU having an independently consumed format generated by encapsulating media fragment unit (MFU), the MFU being data processed by a media decoder, wherein the composition information comprises information on a spatial and temporal relationship among the MMT assets, wherein the composition information is configured based on an Hypertext Markup Language fifth version (HTML5) document, wherein the composition information represents attributes of media elements related to the spatial and temporal relationship among the MMT assets by referencing corresponding attributes in the HTML5 document.

12. The method of claim 11, wherein the receiving the pieces of fragmented content comprises receiving the pieces of fragmented content and the composition information from the server if the composition information is present outside the pieces of fragmented content.

13. A hybrid delivery apparatus for delivering content comprising: a processor that executes a program code stored in a non-transitory computer-readable medium, wherein the computer program code includes instructions to:

fragmenting content;

generate composition information for pieces of fragmented content; and deliver the pieces of fragmented content to a client using delivery means, wherein the pieces of fragmented content are encapsulated into Moving Picture Experts Group Media Transport (MMT) package including at least one MMT asset the composition information (CI), and transport characteristics (TC), wherein the MMT asset is a logical data group of at least one media processing unit (MPU) sharing same asset identifier (asset ID), the MPU having an independently consumed format generated by encapsulating media fragment unit (MFU), the MFU being data processed by a media decoder, wherein the composition information comprises information on a spatial and temporal relationship among the MMT assets, wherein the composition information is configured based on an Hypertext Markup Language fifth version (HTML5) document, wherein the composition information represents attributes of media elements related to the spatial and temporal relationship among the MMT assets by referencing corresponding attributes in the HTML5 document.

14. The apparatus of claim 13, wherein the computer program code further includes instruction to detect the number of pieces of delivery means transmitting the content to the client, wherein the number of fragmented content corresponds to the number of detected delivery means.

15. The apparatus of claim 13, wherein the content comprises at least one of a sub-stream, an MMT asset, an MMT package, an MPU, an MFU, and an MMT packet.

16. The apparatus of claim 13, wherein the composition information is included in at least one of package information of an MMT package, a header of an MMT packet, and a payload.

17. The apparatus of claim 13, wherein all the pieces of fragmented content form a single MMT package.

18. The method of claim 13, wherein each of the pieces of fragmented content forms a single MMT package.

19. The apparatus of claim 13, wherein the computer program code further includes instruction to deliver the pieces of fragmented content and the composition information to the client if the composition information is present outside the pieces of fragmented content.

20. An apparatus for receiving content comprising a processor that executes a program code stored in a non-transitory computer-readable medium, wherein the computer program code includes instructions to:

receive pieces of fragmented content from a server; and aggregate the pieces of fragmented content based on composition information included in the pieces of fragmented content, wherein the pieces of fragmented content are encapsulated into Moving Picture Experts Group Media Transport (MMT) package including at least one MMT asset, the composition information (CI), and transport characteristics (TC), wherein the MMT asset is a logical data group of at least one media processing unit (MPU) sharing same asset identifier (asset ID), the MPU having an independently consumed format generated by encapsulating media fragment unit (MFU), the MFU being data processed by a media decoder, wherein the composition information comprises information on a spatial and temporal relationship among the MMT assets, wherein the composition information is configured based on an Hypertext Markup Language fifth version (HTML5) document, wherein the composition information represents attributes of media elements related to the spatial and temporal relationship among the MMT assets by referencing corresponding attributes in the HTML5 document.

* * * * *